Patented Nov. 11, 1947

2,430,462

UNITED STATES PATENT OFFICE 2,430,462

METHOD OF PRODUCING ORGANOMETALLIC COMPOUNDS CONTAINING 1,3,5-TRIAZINE RINGS

Ernst A. H. Friedheim, New York, N. Y.

No Drawing. Application May 19, 1944,
Serial No. 536,426

4 Claims. (Cl. 260—242)

This invention relates to therapeutically active compounds containing a 1,3,5-triazine ring linked by a nitrogen-containing bridge to an aromatic organic radical containing antimony and to methods of preparing such compounds. It has particular relation to 1,3,5-triazine derivatives in which at least one carbon atom of the triazine ring is linked by a —NH— group to a phenyl-group carrying a trivalent antimony radical and to a method of preparing such triazine derivatives.

I have found that these 1,3,5-triazine-aminophenyl-antimony compounds combine a high tripanocidal as well as a high spirochetocidal activity with a relatively low toxicity.

The compounds according to the present invention correspond to the general formula

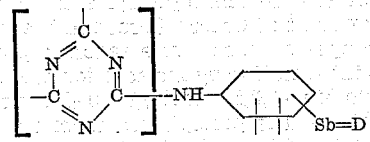

said formula representing new compounds consisting of a 1,3,5-triazine ring, at least one carbon atom of which is linked by a —NH— group to a phenyl-radical carrying a trivalent antimony-radical or to a substituted phenyl-radical carrying a trivalent antimony radical. D represents a divalent radical selected from the group consisting of O, S, dihalides, radicals of the formula

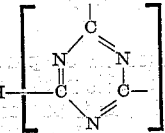

and sulfur-containing groups of the type =(SR)₂, wherein —SR is the residue of a sulfhydril compound of the type HS—R, and R is selected from the group consisting of aliphatic and cyclic radicals. Such sulfur-containing compounds are, for example, thioglycolic acid, cysteine, gluthatione, thiophenol, thioacetic acid, thiobenzoic acid, thioacetamide, thiosalicylic acid, p-sulfhydril-benzene sulfonic acid, thiopropionic acid, p-sulfhydril-phenylacetic acid.

Compounds according to the present invention correspond to the formula

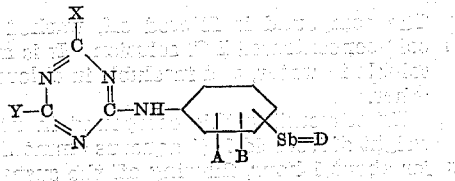

wherein X and Y may be equal or different and may represent halogens or residues of any inorganic or organic, aliphatic or cyclic, isocyclic or heterocyclic, monocyclic or polycyclic molecule containing an active hydrogen atom capable of reacting with a cyanuric halide with the formation of hydrogen halide. For example, X and Y may be selected from the group consisting of Cl, Br, I, F, H, —OH, —O—alkyl, —O—acyl, —NH₂, —NH—alkyl, —N—alkyl₂, —NH—acyl, —NH—NH₂, —NH—NH—alkyl
—N—alkyl—NH₂, —N—alkyl—NH—alkyl
—NH—NH—acyl, —N—acyl—NH₂
—N—acyl—NHacyl, —NHaryl
—NH(CH₂)ₙCONH₂, —NH—(CH₂)ₙ—NH₂
—NH(CH₂)ₙNH—alkyl, —NH(CH₂)ₙN—dialkyl
—NH(CH₂)ₙOH, —NH—CH₂CHOHCH₂OH
—NHOH, —NHCN $$-NH-\underset{\underset{NH}{\|}}{C}-NH_2, \quad -NH-\underset{\underset{NH}{\|}}{C}-NH-CN$$

residues of cyanamide derivatives, residues of substituted guanidines, amino-derivatives of carbohydrates, particularly amino-derivatives of monosaccharides, such as glucose-amine, —SH, substituents of the type —S—R wherein R stands for any aliphatic or cyclic group capable of carrying a —SH group, such as thioglycolic acid and thiophenol, alkyl radicals and their substitution products, isocyclic and heterocyclic radicals, which may be monocyclic or polycyclic, and their substitution products, such as O-aryl groups, substituted aryl radicals, such as those corresponding to the formula

—NH—C₆H₂(A,B)—E
—NH—NH—C₆H₂(A,B)—E wherein A and B may represent equal or different substituents defined further below, and E may represent a radical being in ortho-, meta-, or para-position to the —NH— or —NH—NH— group, and selected from the group consisting of —SO₃H, —SO₂NH₂, —COOH. X and/or Y may also stand for radicals of the formula

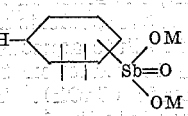

wherein M is selected from the group consisting of hydrogen and salt forming atoms and radicals. X, Y may also stand for radicals of the formula

or for 1,3,5-triazine groups or residues of triazine derivatives. These radicals and said triazine groups or residues of triazine derivatives standing for X and/or Y may be linked directly or indirectly to the ring carbon atoms of the first or central triazine ring. In the latter case, the link between the substituting X, Y radical and the ring carbon atom of the first or central triazine ring may be formed by a cyclic or aliphatic amine radical, for example by an —NH—aryl, —NH—alyl, —NH—NH—aryl or NH—NH—alkyl radical. The link between the first or central triazine ring and the substituting triazine ring standing for X and/or Y may be formed by an —NH—, —NH—NH— group or an aliphatic or cyclic diamine, for example of the formula —NH—C₆H₄—NH— or —NH—CH₂—CH₂—NH—

A and B may be the same or different, and are selected from the group consisting of hydrogen, halogen, —NO₂, —OH, —O—alkyl, —amino-, substituted amino-, and alkyl radicals. The antimony-containing group may be in ortho-, meta- or para-position with respect to the —NH— group.

The compounds embodying the present invention may be prepared by subjecting a triazinyl-aminophenyl compound carrying in the aminophenyl group a pentavalent antimony radical to reduction by means of suitable reducing agents in the manner described hereinafter.

*Example I.*—28 parts by weight of 4-oxy-3-amino-phenylstibonic acid of the formula

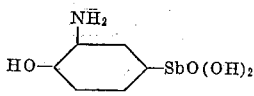

are dissolved in dilute aqueous sodium hydroxide and this solution is added dropwise to a fine suspension of 18.5 parts by weight of 2,4,6-trichloro-1,3,5-triazine in 500 parts by weight of water in the course of one hour while cooling and vigorously stirring. The reaction mixture is then acidified with dilute hydrochloric acid. A white precipitate is formed, which is filtered off and washed with dilute hydrochloric acid, water and acetone. This precipitate, which corresponds to the formula

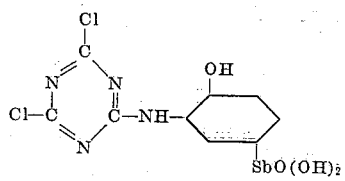

is heated in an autoclave under pressure to 110°–130° C. for about 2 hours with 10 times the quantity of 25% ammonia. The excess ammonia is then driven off, the reaction mixture is acidified in the cold with hydrochloric acid, the precipitate is suspended in dilute aqueous hydrochloric acid and subjected to reduction by the addition of stannous chloride (SnCl₂). The reduced compound corresponds to the formula

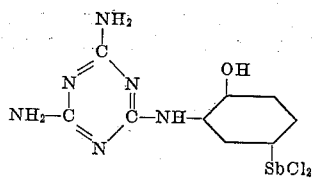

*Example II.*—33 parts by weight of 4-chloro-3-nitro-phenylstibonic acid of the formula

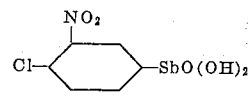

are dissolved in dilute aqueous sodium hydroxide solution, and refluxed with 12.6 parts by weight of triamino-1,3,5-triazine (melamine) under vigorous stirring.

The reaction product, which corresponds to the formula

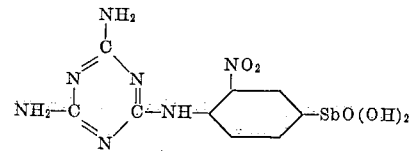

is subjected to reduction by means of SnCl₂ in hydrochloric acid solution, and forms a compound corresponding to the formula

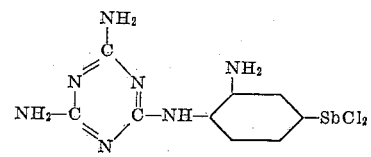

*Example III.*—29 parts by weight of chlorocyanuric diamide are boiled for about 2 hours under reflux with a solution of 28.6 parts by weight of sodium aminophenyl-stibonate in 300 parts by weight of water whereupon the stibanilic acid disappears. The white reaction product is brought into solution by the addition of KOH, and p-[2,4-diamino-1,3,5-triazinyl-(6)-]-aminophenyl-stibonic acid is precipitated from the filtered solution by addition of sulfuric acid.

One part by weight of this compound corresponding to the formula

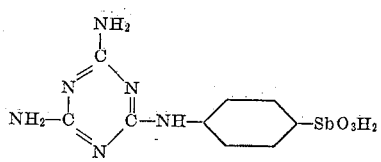

is suspended in 50 parts by weight of aqueous 12% HCl and 1/20 part by weight of HI, and a current of SO₂ gas is passed through the suspension, the temperature being allowed to rise up to 30° C. The suspension clears slowly up. When a clear solution is obtained, the SO₂ current is interrupted, the reaction mixture cooled to 0° C. and saturated with HCl gas. A white precipitate is formed, corresponding to the following formula

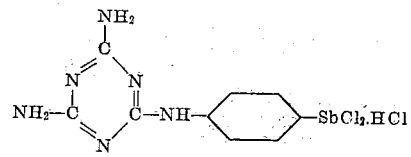

The compound is filtered off, washed with ice-cold concentrated HCl solution. It is moderately soluble in water, and insoluble in chloroform and ether.

By suspending this compound in 30 parts by weight of ice-cold 10% aqueous ammonia, stirring for about 1 hour, filtering off the suspended material, and washing with ice water the corresponding oxide of the formula

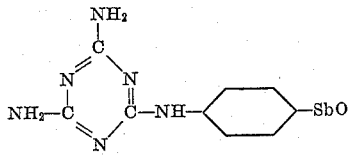

is obtained.

*Example IV.*—A solution of 3.7 g. of (2,4-diamino-1,3,5-triazine-6)-p-aminophenyl-stibanilic acid in 200 cc. of N/20 aqueous KOH are run dropwise with stirring at room temperature into a solution containing 4.0 g. of thioglycolic acid, 3.0 g. of potassium carbonate in 150 cc. of water, in a non-oxidizing atmosphere obtained by passing a stream of nitrogen through the reaction mixture. A milky suspension is formed, which is heated in the non-oxidizing atmosphere to boiling and kept boiling for about 15 minutes, whereupon the bulk of the suspended material goes into solution. The reaction mixture is cooled to 10° C., saturated with $CO_2$, charcoaled and filtered. The clear filtrate is now acidified, preferably with $SO_2$ gas to a pH of about 3.0. A white, flocculent precipitate of (2,4-diamino-1,3,5-triazinyl-6)-p-aminophenyl-stibinoso-dithioglycolic acid corresponding to the formula

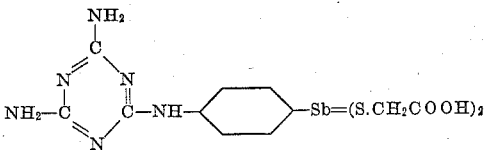

is formed. The precipitate is filtered off, washed with ice water containing $SO_2$ and with alcohol, and is finally dried in vacuo. The compound is soluble in dilute aqueous sodium bicarbonate, sodium hydroxide, potassium hydroxide, and diethylamine. It is insoluble in chloroform and ether. It is precipitated from its neutral or alkaline solution on acidifying it with acetic or mineral acids, but is redissolved in an excess of dilute mineral acids. Dissolved in an excess of strong alkali it gives a purple color on addition of sodium nitroprussate. It decolorizes hot Fehling solution and dissolves without color in concentrated sulfuric acid. It has a high therapeutic index amounting up to 20–25 in experimental tripanosomiasis (*Trypanosoma equiperdum*) in the mouse. One single well tolerated dose of its water soluble alkali salts causes in rabbits the spirochetes to disappear in syphilitic chancres within 24 hours.

Analogous products may be obtained by a substantially identical procedure if instead of thioglycolic acid other suitable products, such as thioglycolamide, thiopropionic acid, 8-mercaptoquinoline, 2-mercapto-pyridine, cysteine, gluthatione, thiosalicylic acid, or p-sulfhydril benzene sulfonic acid are used.

Compounds of the type

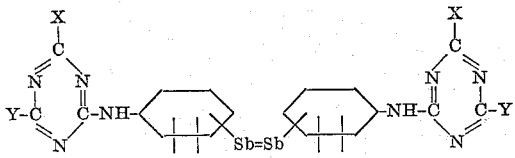

may be obtained by subjecting a 1,3,5-triazinyl-aminophenylstibonic acid compound or a corresponding compound containing a trivalent antimony radical, such as a compound corresponding to the formula

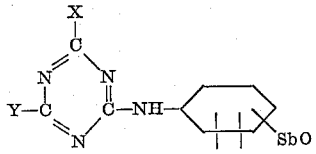

to the action of a suitable reducing agent, such as stannous chloride or hypophosphorous acid ($H_2PO_3$) in hydrochloric acid solution in the presence of HI, or sodium hydrosulfite ($Na_2S_2O_4$) in alkaline solution.

It will be understood that this invention may be carried out in other specific ways than those herein set forth, and the examples should be, therefore, considered as illustrative and not restrictive within the spirit of the invention as defined in the appended claims. The terms "amino" radicals or groups and "aminophenyl" radicals or groups are used in the present specification and claims to include unsubstituted as well as the above disclosed substituted amino radicals and aminophenyl radicals.

Reference is made to my co-pending application Serial No. 506,564, filed October 16, 1943.

I claim:

1. In a process for producing a 1,3,5-triazine compound consisting of a 1,3,5-triazine ring, one ring carbon atom of which is linked to an aminophenyl group in which one of the carbon atoms of the benzene ring is linked to a trivalent antimony radical, the second and third ring carbon atom of said triazine ring each being linked to a radical selected from the group consisting of amino and halogen radicals, said process comprising subjecting a 1,3,5-triazine compound consisting of a 1,3,5-triazine ring, one ring carbon atom of which is linked to a radical of the formula

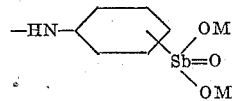

said formula standing for radicals of aminophenyl stibonic acid and its salts, while the other carbon atoms of the triazine ring are linked to a radical selected from the group consisting of amino, hydrazino, halogen and OH radicals, to the action of a reducing agent.

2. A process as claimed in claim 1, in which reduction is carried out in aqueous hydrochloric acid solution with stannous chloride.

3. A process as claimed in claim 1, in which reduction is carried out in acid solution with $SO_2$ gas in the presence of HI.

4. A process for producing a 1,3,5-triazine derivative of the formula

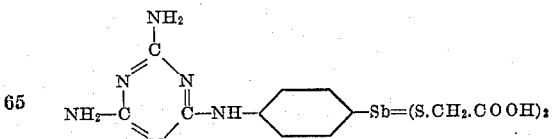

said process comprising reacting one mol of 2,4-diamino-1,3,5-triazinyl-6)-p-aminophenyl stibanilic acid in aqueous alkaline solution with 4 mols of thioglycolic acid.

ERNST A. H. FRIEDHEIM.